United States Patent
Criscione et al.

[11] Patent Number: 6,091,232
[45] Date of Patent: Jul. 18, 2000

[54] STEP-UP/STEP-DOWN VOLTAGE CONVERTER WITH BIPOLAR SYNCHRONOUS RECTIFICATION ELEMENT

[75] Inventors: Marcello Criscione; Luigi Occhipinti, both of Ragusa, Italy

[73] Assignee: STMicroelectronics S.r.l., Agrate Brianza, Italy

[21] Appl. No.: 09/224,564

[22] Filed: Dec. 30, 1998

[30] Foreign Application Priority Data

Dec. 31, 1997 [EP] European Pat. Off. ............... 97830740

[51] Int. Cl.[7] ...................................................... G05F 1/10
[52] U.S. Cl. ........................... 323/222; 323/224; 323/284
[58] Field of Search .................... 323/222, 224, 323/284

[56] References Cited

U.S. PATENT DOCUMENTS

| | | | |
|---|---|---|---|
| 4,549,254 | 10/1985 | Kissel | 323/222 |
| 4,672,303 | 6/1987 | Newton | 323/285 |
| 5,574,357 | 11/1996 | Otake et al. | 323/222 |

FOREIGN PATENT DOCUMENTS 0 617 501 A1   9/1994   European Pat. Off. .

OTHER PUBLICATIONS

McClure et al., "Constant Input Power Modulation Technique for High Efficiency Boost Converter Optimized for Lithium–Ion Battery Applications," APEC'96, Eleventh Annual Applied Power Electronics Conference and Exposition, vol. 2, Conf. 11, San Jose, CA, Mar. 1996, pp. 850–855.

"High Efficiency Boost Converter with Synchronous Clock," *IBM Technical Disclosure Bulletin*, 38(2):223–224, 1995.

*Primary Examiner*—Shawn Riley
*Attorney, Agent, or Firm*—Theodore E. Galanthay; Robert Iannucci; Seed IP Law Group PLLC

[57] ABSTRACT

A DC/DC conversion circuit, adapted to convert a DC input voltage to a DC output voltage, employs a PNP type of bipolar power transistor as a synchronous rectifier element, to allow power-on through a simplified control circuitry capable of sensing, automatically and at a high speed, the difference of potential across the switch. This approach allows power to be transferred from the input to the output unilaterally, while automatically controlling the depth of saturation of the power transistor and regulating its base current.

18 Claims, 2 Drawing Sheets

STEP-UP/STEP-DOWN VOLTAGE CONVERTER WITH BIPOLAR SYNCHRONOUS RECTIFICATION ELEMENT

TECHNICAL FIELD

This invention relates to a step-up/step-down DC/DC conversion circuit with enhanced efficiency.

BACKGROUND OF THE INVENTION

Extensive research and development work is currently being devoted to applications whereto the availability of integrated DC/DC converters characterized by high conversion efficiency, η=80–90%, is of primary value, especially with step-up topologies.

This requirement is more stringent in applications that involve battery-powered apparatus such as pagers, cellular phones, portable computers, and more generally long-range portable apparatus wherein a battery voltage is to be converted to a stabilized voltage of higher value with superior efficiency.

To this aim, it is common practice to use switch elements with very low resistance Ron and high switching rate, that is active elements such as MOSFETs or bipolar transistors in lieu of loop-back diodes.

Converters of this type are referred to as synchronous rectification converters; this means that a control logic must be implemented which can provide for truly synchronous opening and closing of the switch elements, i.e., prevent a simultaneous actuation thereof (cross-conduction) which would result in significant waste of power or unacceptable loss of performance.

A conventional DC/DC converter architecture in a step-up configuration is shown schematically in FIG. 1.

The loop-back element used therein consists of a diode D for transferring energy from the magnetic field of the inductor L to the output capacitor C and the load $Z_O$. An examination of the topology illustrated reveals at once that no regulated output voltage can be obtained which will be lower than the supply voltage minus the voltage drop across the conductive diode ($V_{BEON}$).

This places a limitation on the use of this basic circuit in a mixed step-up/step-down configuration. In addition, the use of the diode D represents a loss factor and heavily curtails the conversion efficiency, due to the voltage drop across it during the ON phase.

For example, where an average current Iout=1A is transferred to the load, with Vout=5V, using a diode at $V_{BEON}$=0.7V, the average power loss would be PD=700 mW and add to that of 500 mW dissipated through the switch during the switching phase, for a power Pout=Vout*Iout=5W being transferred to the load. This produces an efficiency η=80% (Pout/Pin) which is unacceptable for the purpose of long-range battery powering.

A known approach to improving the conversion efficiency η consists of using a Schottky barrier diode characterized by a short recovery time and low values of $V_{BEON}$≅0.35–0.5V.

In this way, efficiency values of η≅83–85% can be achieved in connection with the above example.

Despite its improved efficiency, this topology has a limitation in that the output voltage cannot be regulated when set to values below Vin-$V_{BEON}$.

A further improvement in efficiency can be obtained in the prior art by using active switch elements (pass transistors or MOSFETs) instead of the loop-back diode, as shown in the exemplary circuit of FIG. 2.

The use of an active switch element in place of the loop-back element (diode D) reduces the voltage drop during the transfer of power to the load by a $V_{CESAT}$≅0.2–0.5V where a bipolar transistor is used, or by a $V_{DSON}$≅0.2–0.3V where a power MOSFET is used.

FIG. 2 is a schematic diagram of a synchronous rectifier circuit as applied to a step-up topology employing a P-channel power MOS 20 as the switch element. Besides the control logic 21, sequencing and timing the actuation of the switches 20 and 22, an element sensing the current being delivered to the load ($R_{SENSE}$) is shown in a comparator block 23 operative to control the transfer of power by sending a suitable signal to the control logic.

The signal from the comparator block 23 prevents the power MOS 20 from also transferring power from the load to the input, and thereby reversing the current direction and frustrating all efforts to attain enhanced efficiency.

Keeping this phenomenon under control becomes specially important in a discontinuous mode of operation, wherein the step-up topology is utilized more frequently.

Moreover, the resistor $R_{SENSE}$ introduces an additional power loss equal to Iout*$R_{SENSE}$. This may be unacceptable in certain cases (e.g., in high current applications) by itself.

The reason for using a P-channel power MOS as the switch element is the low $R_{DSON}$ of the power PMOS and the ability to provide a voltage drive rather than a current drive.

Unfortunately, and as brought out by FIG. 2, the body connection of the power PMOS introduces a large-size diode (having the same area as the total area of the power PMOS well) between the input and output terminals. During the start-up phase, with the output voltage still close to zero, this large diode allows a current to pass whose maximum value may far exceed the peak value in steady-state operation (inrush current), and has destructive effects on the passive components (inductor L) unless these are provided oversize in order to survive the initial transient phase.

Accordingly, this would involve increased size for the inductor L and the printed circuit connection layout, as well as increased cost and a heavily stressed power supply. The last-mentioned aspect greatly restricts the possible range of battery powered apparatus. A reduction of the maximum value of the inrush current, as obtained by means of a limiter resistor, if safeguarding the integrity of the components, would bring about unacceptable power losses.

Lastly, the presence of the parasitic diode again would make regulation of the output voltage impracticable at values below Vin-$V_{BE}$ (step-down configuration).

Thus the prior art solutions, although providing highly efficient step-up converters, have certain limitations and deficiencies, such as complex control logic circuitry, the effects of possible cross-conduction phenomena, and the impossibility of implementing a mixed step-up/step-down mode of operation.

SUMMARY OF THE INVENTION

An embodiment of this invention provides an enhanced-efficiency DC/DC conversion circuit which has a mixed architecture of the step-up/step-down type and can be simple circuit-wise.

The embodiment uses, as a synchronous rectifier in a DC/DC converter, a power switch (specifically, a PNP bipolar power transistor), and enables it to be turned on through a simplified control circuitry capable of automatically and promptly detecting the difference of potential across the switch.

The DC/DC converter includes an input terminal at which a DC input voltage is present, an output terminal at which a DC output voltage is produced, an inductor coupled to the input terminal, a power transistor and a control circuit that based on a difference in potential between first and second terminals of the power transistor. The control circuit includes a comparator and a drive circuit that drives the power transistor in response to an enable signal from the comparator. The comparator has three inputs coupled to the input terminal, output terminal, and first terminal of the power transistor. The comparator compares the voltages at the three inputs and supplies the enable signal to the drive circuit based on the comparison.

This approach allows power to be transferred unilaterally, and the depth of the power PNP saturation to be controlled automatically and its base current regulated.

The features and advantages of a circuit according to the invention will be more clearly apparent from the following detailed description of embodiments thereof, illustrated by way of non-limitative examples in the accompanying drawings.

DETAILED DESCRIPTION

Figure 1:
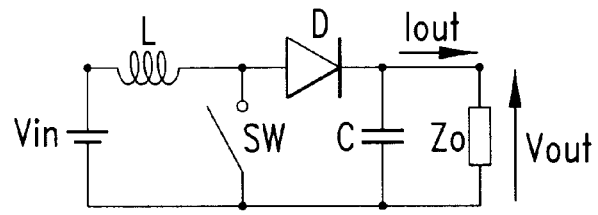
FIG. 1 is a schematic diagram of a DC/DC conversion circuit in a step-up configuration, according to the prior art.
Figure 2:
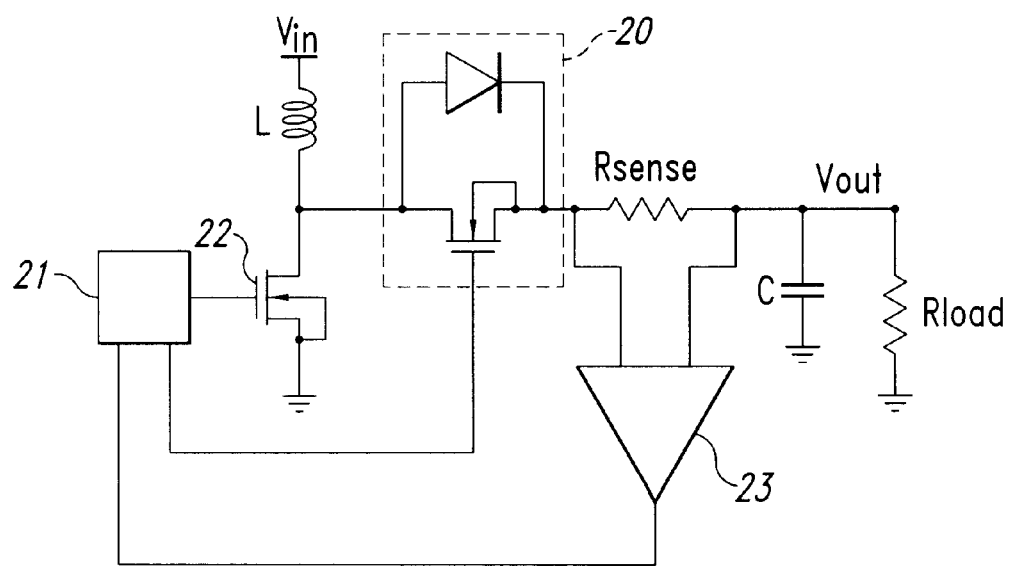
FIG. 2 is a schematic diagram of a synchronous rectifier circuit as applied to a step-up converter, according to the prior art.
Figure 3:
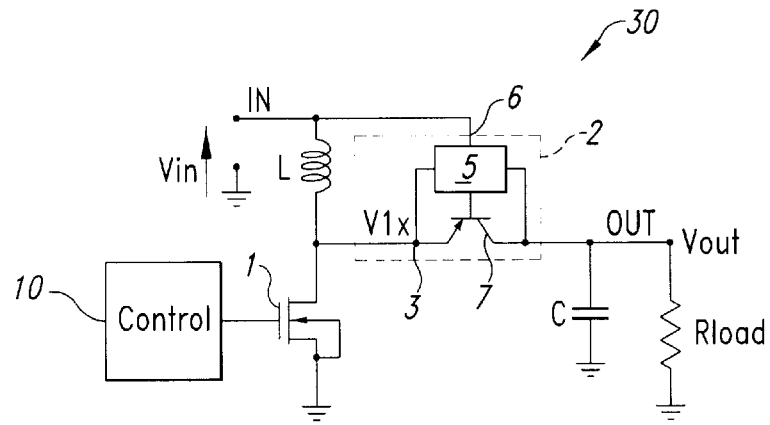
FIG. 3 is a schematic diagram of a DC/DC conversion circuit, according to this invention.

Shown in FIG. 3 is a circuit diagram of a DC/DC converter, generally denoted by the reference numeral 30, which embodies this invention.

The DC/DC conversion circuit has an input terminal IN, to which is applied an input voltage Vin, and an output terminal OUT whereat a stabilized output DC voltage Vout is presented.

The circuit 30 comprises the following elements:

an inductor L that transfers energy from the input terminal IN to the output terminal OUT;

a capacitor C connected to the output terminal OUT for storing energy transferred from the inductor L;

a first electronic switch 1 coupling the inductor to a ground reference voltage; and a second electronic switch 2 coupling the inductor L to the output terminal OUT.

The first electronic switch 1 is an N-channel MOS power transistor, and is timed by a control circuit 10.

The second electronic switch 2 has a first terminal 3 coupled to the inductor L and a second terminal 4 coupled to the output terminal OUT of the converter, and comprises a power transistor 7 having its main conduction path connected between the first 3 and second 4 terminals, and a control circuit 5 which drives the transistor 7 by sensing the difference of potential between the first 3 and second 4 terminals of the switch.

The control circuit 5 drives the power transistor 7 to conduction when the potential V1x at the first terminal 3 is higher than the potential Vout at the second terminal 4.

In this embodiment, the power transistor 7 is a PNP bipolar power transistor.

The control circuit 5 has an additional input 6 coupled to the input terminal IN of the converter for sensing the potential of the input voltage Vin. This additional input terminal 6 allows the control circuit 5 to compare the input voltage Vin with the output voltage Vout and, therefore, to perform satisfactorily in the step-up as well as step-down modes.

Figure 4:
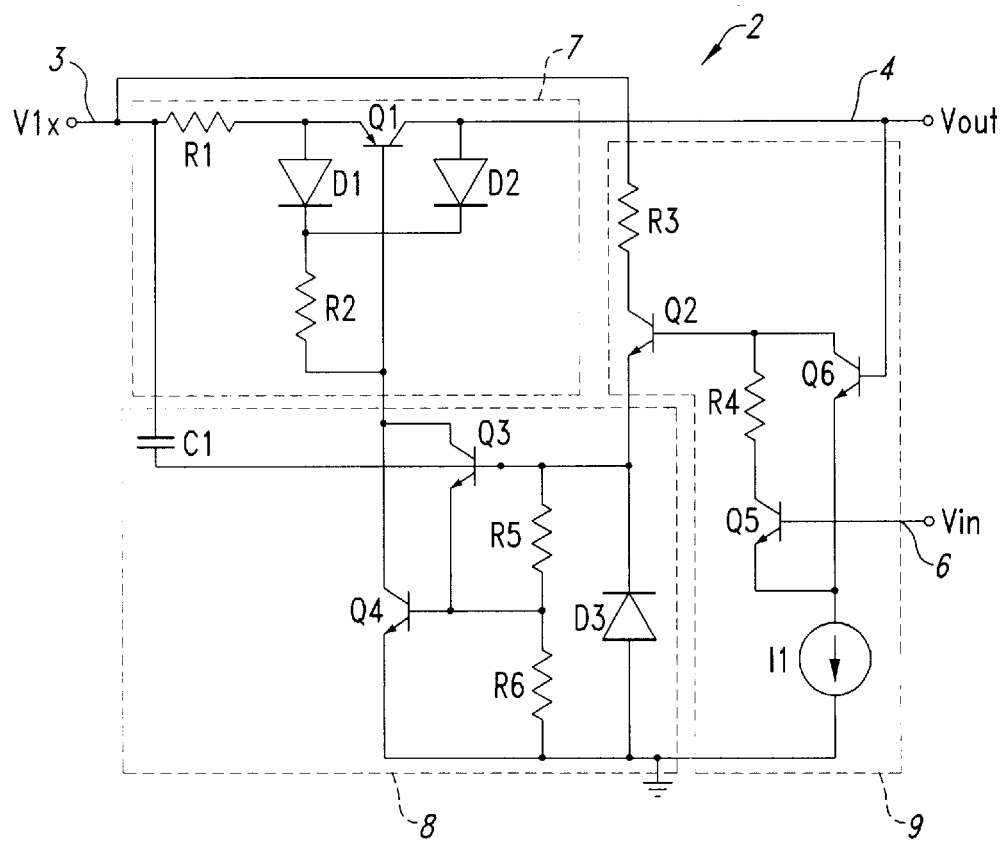
FIG. 4 is a circuit diagram of an embodiment of a portion of the circuit shown in FIG. 3.

FIG. 4 shows in detail the circuit construction of the second electronic switch 2. This construction comprises three main blocks: a block 7 implementing the power transistor, a drive block 8, and a compare block 9.

In particular, said blocks function as explained herein below.

The block 7 comprises a PNP power transistor Q1 with a high $h_{FE}$ and high speed of recovery, suitably patterned using high-speed bipolar technologies with a high density of integration. As said before, this transistor functions as a controlled saturation switch element, to provide an appropriate low-drop switching element for high-efficiency conversion.

The drive block 8 supplies the power transistor base current, and modulates its value according to the depth of saturation attained by the transistor and to a current signal from the compare block.

The compare block 9 will only power the drive block 8 as the voltage V1x exceeds the voltage Vout, that occurring when Vin≦Vout. But when Vin>Vout, the block only powers the drive block 8 as V1x>Vin. In this way, power can be transferred from the magnetic field of the inductor to the output, but not in the opposite direction. This block is also effective to prevent overpassing the saturation level of the power transistor Q1 to the point that too large a base current would be needed, the saturation level being precision set by the ratio of two resistors. This would indeed result in a power loss of approximately $I_B*V1x$, i.e., a substantial value for high supply or output voltages when one considers that during the transfer of power V1x>max(Vin,Vout) holds in all events.

In particular, the circuit allows power to be transferred unidirectionally from the node V1x to the node Vout only when the potential at the node V1x exceeds the higher of the potentials Vin and Vout.

The operation of the blocks shown in FIG. 4 will now be described in detail.

The current generator I1 delivers a predetermined current to the emitters of the transistors Q6 and Q5, whereby the transistors are only enabled to transfer current to their respective collectors if they are outside their saturation range, i.e., if:

$$V_{C5}>Vin-V_{BE} \text{ and } V_{C6}>Vout-V_{BE} \qquad (1)$$

where, $V_{C5}$ and $V_{C6}$ are the collector voltages of the transistors Q5 and Q6.

This means that for Q6 to become conductive, it should be:

$$V1x>Vout-V_{BE6}+V_{BE2}+V_{CESAT6} \qquad (2)$$

when Vout>Vin; in fact, under this condition, the current from the generator I1 can flow through Q6 only, because $V_{BE5}$=Vin−Vout−$V_{BE6}$<0 (and, therefore, the transistor Q5 remains OFF).

This is what happens when the input voltage to the regulator is lower than the output voltage, i.e., in the step-up mode of operation.

If the transistor Q6 becomes conductive, then the transistor Q2 can go ON and pass current to the bases of the Darlington transistor pair Q3, Q4.

The transistor Q3 can only be turned on when:

$$I_{C2}*R5>V_{BE3}; \quad (3)$$

for this to occur, since $$I_{C2} \cong \frac{V_{LX} - Vout - V_{CE6}}{R_3},$$

it should be:

$$V1x-Vout \geq V_{BE3}*R3/R5+V_{CE6} \quad (4)$$

In view of that the transistor Q6 is biased with a very small current ≅8 microamperes and is formed with less than minimal area, as a first approximation the voltage $V_{CE6}$ can be neglected and the saturation value of the power transistor Q1 be considered which, since:

$$V1x-Vout=V_{CESAT1}+R1*I_{C1} \cong V_{BE3}*R3/R5 \quad (5)$$

Therefore, this value is dependent on the readily controllable ratio R3/R5 and the product $R1*I_{C1}$, where R1 is the resistance of the connection between the terminal 3 (V1x) and the emitter of the power transistor Q1. Further, the value of the voltage $V_{BE3}$ is also readily controlled with the technology employed, and neglecting R1 yields a temperature dependence of about −2 mV/° C. for $V_{CESAT1}$.

The dependence on $I_{C1}$ ensures that the saturation will never be deeper than acceptable values whereat a large $I_{B1}$ would slow the exit of the power transistor Q1 from the saturation range. This is, in fact, a phenomenon that brings about poor conversion efficiency and cross-conduction.

To further speed up the power transistor Q1 turn-off, the anti-leakage resistor R6 for the transistor Q4 and the set of diodes D1 and D2 with the resistor R2 are provided in order to drive the base potential of the power transistor Q1 to the higher of the values V1x and Vout in the power-off state.

The use of the diode pair D1, D2 originates from that, when the supply voltage Vin exceeds Vout, the potential V1x reaches the value Vin, with a dampened sinusoidal pattern during the idle phase of the inductor discharge cycle. The diode D2 alone would not be able to ensure a fast turn-off of Q1 under such condition.

Finally, the capacitor C1 introduces a pole in the feedback loop, and is mainly directed to speeding up the turn-on of Q1, as well as the turn-off of the pair Q3, Q4 in the continual mode of operation.

The diode D3 is arranged to prevent the base potential of Q3 from falling below the ground potential, which could damage the potential wells of the components Q3 and R5.

The instance analyzed thus far concerned the Vout>Vin (step-up) condition.

In the reverse instance of Vin>Vout (step-down), the condition (5) would become:

$$V1x-Vin \cong R3*I_{C2}+R4*I_{C5}+V_{CESAT5} \quad (7)$$

i.e., neglecting $V_{CESAT5}$ by the same reasoning as applied to the transistor Q6:

$$V1x-Vin \cong R3*I_{C2}+R4\cdot I_{C5} \quad (8)$$

In this condition, with Vin>Vout, the power transistor Q1 would be operating in the linear range, at a small base current delivered from the pair Q3, Q4, whenever it is:

$$I_{C2}*R5>V_{BE3} \quad (9)$$

i.e.,, $$V1x-Vin>V_{BE3}*R3/R5+R4*I_{C5} \quad (10)$$

Thus, the rectifier stage would be operating in the linear range, because:

$$V_{CE1}=V1x-Vout>V1x-Vin \quad (11)$$

The resistor R4 is to control, in this particular operating condition, the overall base current of the power transistor Q1, with $I_{C5}$ being known and equal to the current I1.

Thus, the circuit herein differs from conventional synchronous rectifier architectures and overcomes their limitations to further afford the following advantages:

it provides for automatic step-up/down operation without discontinuity;

it automatically controls the depth of saturation of the power switch;

it is capable, in a shut-down condition, of thoroughly uncoupling the load from the voltage source, thereby to de-activate the transfer of power;

it has minimal static consumption (approximately 8 microamperes) in the standby condition;

it allows DC/DC converter circuits to be made with a minimum of external components, in place of the external loop-back diode;

its circuit complexity is minimized.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A DC/DC conversion circuit having at least one input terminal and an output terminal, and being adapted to convert a DC input voltage to a DC output voltage, which circuit comprises:

an inductor adapted to transfer energy from said input terminal to said output terminal;

a capacitor connected to the output terminal for storing energy transferred from the inductor;

a first electronic switch coupling the inductor to a reference voltage;

a second electronic switch coupling the inductor to the output terminal, wherein the second electronic switch has at least a first terminal connected to a terminal of the inductor and has a second terminal coupled to the output terminal of the converter, and comprises a power transistor having a main conduction path connected between said first and second terminals and a control circuit which senses a difference of potential between said first and second terminals and drives the power transistor, wherein the control circuit comprises a drive block adapted to drive the power transistor and a compare block supplying an enable signal to the drive block, which compare block has at least three input terminals connected to said first terminal, said second terminal, and said input terminal of the control circuit, respectively.

2. A circuit according to claim 1, wherein the compare block enables the drive block upon a potential at the first terminal exceeding a potential at the second terminal.

3. A circuit according to claim 2, wherein the power transistor is a PNP type of bipolar power transistor.

4. A circuit according to claim 1, wherein the compare block enables the drive block upon a potential at the first terminal exceeding a potential at the second terminal, if the DC input voltage is equal to or below the DC output voltage, or upon the potential at the first terminal exceeding the potential at the input terminal of the control circuit, if the DC input voltage is above the DC output voltage.

5. A circuit according to claim 4, wherein the power transistor is a PNP type of bipolar power transistor.

6. A DC/DC conversion circuit, comprising:
   an input terminal at which a DC input voltage is present;
   an output terminal at which a DC output voltage is produced;
   an inductor coupled to the input terminal;
   a first power transistor having a control terminal, a first terminal coupled to the input terminal via the inductor, and a second terminal coupled to the output terminal; and
   a control circuit having first and second input terminals coupled respectively to the first and second terminals of the first power transistor, and an output terminal coupled to the control terminal of the first power transistor, the control circuit being structured to drive the first power transistor based on a difference in potential between the first and second terminals of the first power transistor, wherein the control circuit includes a third input terminal coupled to the input terminal of the conversion circuit.

7. The conversion circuit of claim 6, further comprising a capacitor coupled to the output terminal of the conversion circuit to store energy transferred from the inductor via the first power transistor.

8. The conversion circuit of claim 6, further comprising:
   a second power transistor having a control terminal, a first terminal coupled to the inductor and the first terminal of the first power transistor, and a second terminal coupled to a reference voltage; and
   a timing circuit coupled to the control terminal of the second power transistor and thereby provide timing for coupling the inductor to the reference voltage.

9. The conversion circuit of claim 6 wherein the control circuit includes a drive block structured to drive the first power transistor and a compare block that senses the difference in potential between the first and second terminals of the first power transistor and provides an enable signal to the drive block when a potential at the input terminal of the conversion circuit exceeds a potential at the output terminal of the conversion circuit.

10. The conversion circuit of claim 6 wherein the control circuit includes a drive block having an input terminal and output terminal coupled to the control terminal of the first power transistor and a comparator having an output terminal coupled to the input terminal of the drive block, a first input terminal coupled to the first terminal of the first power transistor, a second input terminal coupled to the second terminal of the first power transistor, and a third input terminal coupled to the input terminal of the conversion circuit.

11. The conversion circuit of claim 10 wherein the comparator includes a first transistor coupled between the first input and output terminals of the comparator; a second transistor having a control terminal coupled to the second input terminal of the comparator, a first terminal coupled to a control terminal of the first transistor, and a second terminal; and a third transistor having a control terminal coupled to the third input of the comparator and first and second terminals respectively coupled to the first and second terminals of the second transistor.

12. The conversion circuit of claim 11 wherein the comparator includes a current generator coupled between the second terminal of the second transistor and a reference voltage and the drive circuit includes a Darlington switch having a control terminal coupled to the output terminal of the comparator, a first terminal coupled to the reference voltage, and a second terminal coupled to the output terminal of the drive circuit.

13. The conversion circuit of claim 12 wherein the drive circuit includes a capacitor coupled between the first input and the output terminals of the comparator.

14. A method of providing DC/DC conversion between a DC input voltage at an input terminal and a DC output voltage at an output terminal using a conversion circuit having an inductor and a switch coupled between the input and output terminals and coupled to each other at an intermediate node, the method comprising:
   sensing a voltage at the intermediate node;
   comparing the intermediate node voltage with the output voltage;
   comparing the input voltage with the output voltage; and
   closing the switch to electrically connect the inductor with the output node based on the comparison steps.

15. The method of claim 14 wherein the closing step includes closing the switch to electrically connect the inductor with the output node if the input voltage exceeds the output voltage and the intermediate node voltage exceeds the input voltage.

16. The method of claim 14 wherein the closing step includes closing the switch to electrically connect the inductor with the output node if the input voltage does not exceed the output voltage and the intermediate node voltage exceeds the output voltage.

17. A circuit according to claim 1 wherein the compare block includes an output terminal at which the enable signal is produced, a first transistor coupled between the first input and output terminals of the compare block; a second transistor having a control terminal coupled to the second input terminal of the compare block, a first terminal coupled to a control terminal of the first transistor, and a second terminal; and a third transistor having a control terminal coupled to the third input of the compare block and first and second terminals respectively coupled to the first and second terminals of the second transistor.

18. A circuit according to claim 17 wherein the compare block includes a current generator coupled between the second terminal of the second transistor and a reference voltage and the drive block includes an output terminal coupled to a control terminal of the power transistor, a Darlington switch having a control terminal coupled to the output terminal of the compare block, a first terminal coupled to the reference voltage, and a second terminal coupled to the output terminal of the drive block.

* * * * *